United States Patent [19]
Lambert et al.

[11] 3,785,205
[45] Jan. 15, 1974

[54] DEVICE FOR TRANSFERRING AND MEASURING THE FLOW OF PURE GAS

[75] Inventors: Andre Lambert, Gif-sur-Yvette; Jean-Pierre Soury, Igny; Gaston Sifre, Orsay, all of France

[73] Assignee: Societe Generale de Constructions Electriques et Mecaniques (Alsthom), Paris, France

[22] Filed: June 15, 1972

[21] Appl. No.: 262,945

[30] Foreign Application Priority Data
June 5, 1971 France.............................. 7121777

[52] U.S. Cl. ............................................. 73/198
[51] Int. Cl. ............................................. G01f 1/00
[58] Field of Search................. 73/198, 201, 209; 137/285, 299, 300

[56] References Cited
UNITED STATES PATENTS
2,882,725   4/1959   Goodhue .............................. 73/209
2,995,931   8/1961   Perry et al. .......................... 73/198

Primary Examiner—Richard C. Queisser
Assistant Examiner—Arthur E. Korkosz
Attorney—Paul M. Craig, Jr. et al.

[57] ABSTRACT

Device for transferring and measuring the flow of very pure gas, comprising a connection block, to which is linked, upstream, in the direction of flow of the gas, a flowmeter having a calibrated tube and a float, and inside which are arranged a flow regulating valve and two stop valves each ensuring communication with a gas utilization circuit. The valves and the connection pipes inside the block are arranged so that the paths followed by the gas inside the block are the same whatever the utilization circuit. The adjusting valve and the flowmeter are interchangeable.

10 Claims, 1 Drawing Figure

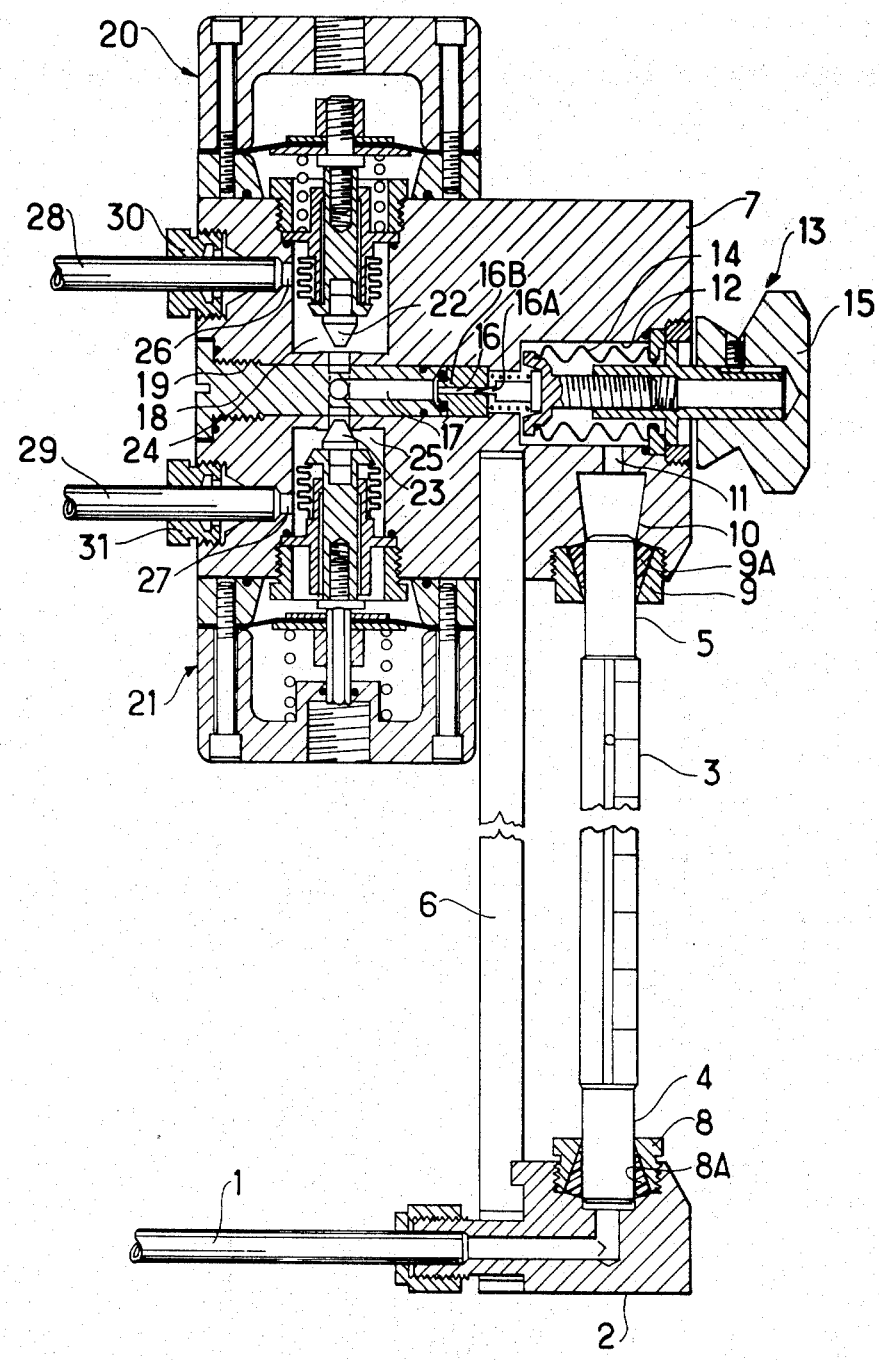

DEVICE FOR TRANSFERRING AND MEASURING THE FLOW OF PURE GAS

The present invention concerns a device for transferring and measuring the flow of very pure gas, comprising a massive connection block to which is linked, upstream, in the direction of flow of the gas, a flowmeter having a calibrated tube and a float, and inside which block are arranged a flow regulating valve and at least two stop valves each ensuring communication with a gas utilization circuit.

Devices for transferring and measuring the flow of gas, in which the flowmeter, the flow regulating valve and the stop valves are linked by connections, are known. But the fluid-tight sealing of these various connections is not absolute, so that a gas which, originally, is pure when inserted in the flowmeter is polluted on emerging therefrom.

As has been proposed for gas sampling devices for analysis by chromatography, the arranging of the valves in the bores of a massive connection block and the connection thereof by ducts arranged inside the block could be considered. This could, however, cause variable pressure losses inside the block according to the utilization circuit which is supplied, so that the measuring of the flow by the flowmeter arranged at the input of the block would not be accurate. Moreover, it would become difficult to change the calibrated tube of the flowmeter and the regulating valve when changing over from one range of flow outputs to another which is quite different.

The present invention aims at overcoming the above disadvantages and at producing a device for transferring and measuring the flow of gas enabling the measuring and regulating of the flow with great accuracy by keeping the gas pressure loss in the connection block at a fixed value, and by making it possible to change over from one flow output range to another by simple and rapid operations for substituting the calibrated tube of the flowmeter and of the element for regulating the cross section of the gas flow passage in the flow regulating valve.

The device according to the invention is characterized in that the regulating valves, the stop valves and the connection ducts between the regulating valve and the stop valves are arranged so that the paths taken by the gas in the block, from the regulating valve to the outputs of the stop valves, are the same. Moreover, it comprises, preferably, at least one of the following characteristics.

The flow regulating valve comprises an interchangeable element for regulating the cross section of the gas flow passage in an orifice, and a removable plug enabling access to the said element for regulating the cross section of the flow passage in order to change it, is arranged in the connection block opposite the regulating valve.

The flowmeter having a calibrated tube and a float is fixed, on the one hand, to a connection head at the gas intake by connections which can be unscrewed, and in that a truncated cone shaped cavity having a small base on the calibrated tube end side, and having a height and a conicity such that they make it possible, by pressing the tube into the cavity, after having unscrewed the connections, to remove the tube without removing the connection head, and to replace it by a calibrated tube corresponding to another flow range, is arranged in the connection block opposite the end of the calibrated tube.

A device for transferring and measuring the flow of very pure gas, according to the invention, is described herebelow, by way of an example and with reference to the accompanying drawing in which the single FIGURE is a cross-sectional view through the device.

The gas to be transferred arrives through the tube 1 in the head 2 of the flowmeter. A flowmeter having a float and a transparent graduated tube 3 with ground ends 4 and 5 is fixed in the head 2. The head of the flowmeter is firmly fixed by a metal beam 6 to the connection block 7. The latter may be made of stainless steel, an alloy (containing approximately 94.5 percent aluminum, 4 percent copper, 0.5 percent manganese, 0.5 percent magnesium and 0.5 percent silicon) known by the trade name "Duralumin", or any other metal or alloy having the required strength and anti-corrosion characteristics. The transparent tube 3 is fixed in a fluid-tight manner, on the one hand, to the head 2, and on the other hand, to the connection block 7, by means of conical connections 8 and 9 made fluid-tight by seals 8A and 9A.

The end 5 of the tube leads into a truncated cone shaped cavity 10 of the connection block 7, whose small base is on the tube side. The height of that cavity and the angle at the top of the truncated cone are such that they make it possible, after having pressed the end 5 into the cavity, and after the tube has been tipped over towards the right of the figure, to clear the latter from the head 2. The tube can then be replaced by another tube suitable for measuring in the flow range anticipated, which is assembled by the reverse operation.

The cavity 10 is connected up by a drilled orifice 11 to the bore 12 of the flow regulating valve 13. The latter can be of any known type ensuring fluid-tight sealing with respect to the ambient atmosphere. It comprises a bellows 14 preventing leakage along the control rod, which ends in a regulating knob 15. That rod makes it possible to vary the cross section of a gas flow passage across an orifice 16, for example, by means of a needle of the whistle valve type 16A.

The output orifice of the valve 13 in the seat 16B is connected to a short duct 17, drilled in a removable plug 18 screwed in a fluidtight manner into a bore 19 of the connection block, coaxial with the regulating valve 13, and whose end is connected by ports to the duct orifices of the pneumatic stop valves 20 and 21, these orifices being capable of becoming closed by the cones 22 and 23, respectively. In the position shown, the valve 20 is open and the valve 21 closed, its cone 23 being pressed against its seat, due to the pressure applied against its control diaphragm.

If the needle of the valve 13 is to be replaced by another needle suitable for regulating in a different flow output range, the plug 18 is unscrewed and the seat 16B of the valve 13, then its needle 16A, are removed. After having fixed a new needle on the end of the rod of the valve 13, the seat of the valve is installed again, and the plug 18 is screwed on.

The chambers 24 and 25 of the pneumatic valves 20 and 21 are connected by lateral orifices 26 and 27, respectively, to the output tubes 28 and 29, which are connected to the connection block 7 by fluid-tight connections 30 and 31. The circuit connected to the tube 28 can be, for example, a drainage circuit, and that connected to the tube 29, a utilization circuit. It may be seen that if the gas is to be made to pass in the utilization circuit, it is sufficient to set the valve 20 in the closed position, and the valve 21 in the open position.

The valves being identical, and their configuration symmetrical in relation to the regulating valve 13, the loss of pressure of the gas in the connection block 7 is not modified. The gas flow can be regulated, moreover, with precision, as a function of the readings of the flowmeter 3, by means of the valve 13.

Although the structure of the device for transferring and measuring the flow of very pure gas which has just been described is preferred, it will be understood that various modifications may be made thereto without going beyond the scope of the invention. More particularly, the stop valves may be manually controlled. The number of utilization circuits and of corresponding stop valves may be greater than two, the plug making the output of the regulating valve communicate with the orifices of the stop valves then being replaced by a cylinder comprising a corresponding number of lateral ports.

What is claimed is:

1. Device for transferring and measuring the flow of very pure gas, comprising a massive connection block having an inlet and at least two outlets, a first connection duct in said connection block extending between said inlet and at least two additional connection ducts, said at least two additional connection ducts extending respectively to said at least two outlets, a flowmeter connected to said inlet, a flow regulating valve arranged inside said connection block in said first connection duct and at least two stop valves arranged inside said connection block respectively in said at least two additional connection ducts, each ensuring communication with a gas utilization circuit, said regulating valve, the stop valves and the connection ducts between the regulating valve and the stop valves being arranged so that similar paths are followed by the gas in the block from the regulating valve to the outlets of the stop valves.

2. Device as defined in claim 1 wherein the connection duct between said inlet and said at least two outlets includes an orifice, said flow regulating valve including an interchangeable element for regulating the cross section of the gas flow passage formed by said orifice.

3. Device as defined in claim 2 wherein a removable plug is arranged in said connection block opposite said regulating valve for providing access to said interchangeable element.

4. Device as defined in claim 1 wherein said calibrated tube is inserted at one end in said inlet, a connection head secured to said block and having the other end of said calibrated tube removably secured thereto, said inlet of said block being provided in the form of a truncated cone shaped cavity having a small base on the calibrated tube end side such that the calibrated tube may be pressed into the cavity and displaced pivotally to disengage said other end thereof from said connection head without removal of said head from said block.

5. Device as defined in claim 4 wherein the connection duct between said inlet and said at least two outlets includes an orifice, said flow regulating valve including an interchangeable element for regulating the cross section of the gas flow passage formed by said orifice.

6. Device as defined in claim 5 wherein a removable plug is arranged in said connection block opposite said regulating valve for providing access to said interchangeable element.

7. Device as defined in claim 6 wherein said block has a through passage one end of which is closed by said removable plug and the other end of which is closed by said flow regulating valve, said truncated cone shaped cavity being connected to said through passage, said connection ducts connecting said at least two outlets to said through passage.

8. Device as defined in claim 7 wherein said stop valves are pneumatic valves which regulate the flow in said connection ducts between said through passage and said at least two outlets.

9. Device as defined in claim 1, wherein the connection block is provided with only two outlets and wherein only two similar connection ducts extend from said first connection duct to said two outlets, each of said two additional connection ducts, respectively, having one stop valve arranged therein.

10. Device as defined in claim 1, wherein the flowmeter includes a calibrated tube and a float in the calibrated tube.

* * * * *